United States Patent [19]
Go

[11] Patent Number: 6,091,938
[45] Date of Patent: Jul. 18, 2000

[54] MICROPHONE ATTACHMENT FOR ELECTRICALLY CONNECTING THE MICROPHONE AND AUDIO CIRCUIT OF A FLIP-TYPE RADIO PHONE WITH A MECHANICAL CONTACT DEVICE

[75] Inventor: Sung-Soo Go, Seoul, Rep. of Korea

[73] Assignee: Samsung Electronics Co., Ltd., Rep. of Korea

[21] Appl. No.: 08/967,646

[22] Filed: Nov. 10, 1997

[30] Foreign Application Priority Data

Mar. 4, 1997 [KR] Rep. of Korea .......................... 97-6986

[51] Int. Cl.⁷ ...................................................... H04B 1/38
[52] U.S. Cl. ................................. 455/90; 379/433; 16/303
[58] Field of Search ............................. 455/90, 128, 575, 455/347, 351; 379/433, 428, 434, 422; 16/261, 262, 263

[56] References Cited

U.S. PATENT DOCUMENTS

| | | | |
|---|---|---|---|
| 5,629,979 | 5/1997 | Domoleczny ............................ | 379/433 |
| 5,661,797 | 8/1997 | Leman et al. ............................ | 379/433 |
| 5,692,045 | 11/1997 | Takagi et al. ............................ | 379/433 |
| 5,704,094 | 1/1998 | Hartigan et al. ........................ | 379/433 |
| 5,732,331 | 3/1998 | Harms ....................................... | 455/90 |
| 5,761,300 | 6/1998 | Domoleczny ............................ | 379/433 |
| 5,764,760 | 6/1998 | Grandbert et al. ...................... | 379/433 |
| 5,799,079 | 8/1998 | Inoue ........................................ | 379/433 |
| 5,859,909 | 1/1999 | Takagi et al. ............................ | 379/433 |
| 5,881,150 | 3/1999 | Persson .................................... | 379/433 |

*Primary Examiner*—Daniel S. Hunter
*Assistant Examiner*—Pablo Tran
*Attorney, Agent, or Firm*—Dilworth & Barrese

[57] ABSTRACT

A radio phone having a microphone attachment for electrically connecting the microphone and an audio circuit. The radio phone having a flip with the microphone embedded therein, a telephone body and connecting device for connecting the flip and the telephone body to hingedly and electrically connect the microphone with the telephone body.

3 Claims, 4 Drawing Sheets

MICROPHONE ATTACHMENT FOR ELECTRICALLY CONNECTING THE MICROPHONE AND AUDIO CIRCUIT OF A FLIP-TYPE RADIO PHONE WITH A MECHANICAL CONTACT DEVICE

BACKGROUND OF THE INVENTION

1. Field of the Invention

The present invention concerns a flip-type radio phone, and more particularly a microphone attachment for electrically connecting the microphone and audio circuit of such flip-type radio phone with a mechanical contact device.

2. Description of Related Art

In the present disclosure, the radio phone is defined as indicating both a cellular phone set for communicating with base stations and a portable handset for communicating with an ordinary telephone set fixedly connected with the phone line.

The flip-type radio phone has been developed to reduce the size of the radio phone. The flip-type radio phone includes a flip and a main set. The flip is attached to the main set by means of a hinge mechanism or flip module so as to be closed to or opened from the main set. The communication mode is automatically set by opening the flip. In this case, if the microphone is mounted within the flip, the length of the main set may be considerably reduced, because the length of the flip can compensate for the reduced length of the main set to maintain a proper distance, i.e., more than about 14 cm, between the mouth of the user and the ear when using the phone. The flip also serves to reflect the voices and protect the switch buttons.

In such flip-type radio phone, if the flip having the microphone is fractured or the junction between the flip and main set for mechanically connecting the microphone and the main set is worn out, the radio phone cannot properly function.

SUMMARY OF THE INVENTION

It is an object of the present invention to provide a flip-type radio phone which properly functions even if the junction between the flip and the main set is worn out.

It is another object of the present invention to provide a flip-type radio phone with a microphone attachment for functionally connecting the microphone attached to the flip with the audio circuit of the main set by means of electrical contact surfaces provided in the connecting device for connecting the flip and main set.

According to an illustrative embodiment according to the present invention, a microphone attachment for electrically connecting the microphone and audio circuit of a flip-type radio phone having a flip, main set, and connecting device for connecting the flip and main set, comprises a mechanical contact device arranged in the connecting device for electrically connecting the microphone arranged in the flip with the audio circuit arranged in the main set.

In one aspect of the present invention, the mechanical contact device includes a pair of hinge housings each having through holes symmetrically attached to both sides of the connecting device. A hinge shaft is inserted into each of the hinge housings through one end of the through hole so as to project an end portion of the hinge shaft out of the other end of the hinge housing. A projection is formed at the other end of the hinge shaft. A shaft hole is formed along the central axis of the hinge shaft. A conductor cap is attached to the one end of the hinge shaft. A cam hinge has a depressed and a projected part at one end and a spring support part at the other end. The depressed part is engaged with the projection of the hinge shaft. A cam hole is formed along the central axis of the cam hinge concentrically with the shaft hole. A hinge cover is arranged to face the spring support part of the cam hinge for covering each of the hinge housings. A cover hole is formed along the central axis of the hinge cover concentrically with the cam hole.

In addition, a coil spring is compressively disposed between the cam hinge and hinge cover. A wire is inserted into the shaft hole, cam hole and cover hole with one end firmly connected to the conductor cap and the other end connected to the audio circuit. The diameters of the cam hole and cover hole are made greater than the diameter of the wire so as to allow sliding motions of the cam hinge and hinge cover along the wire upon opening or closing from or to the main set. A pair of electrical contact surfaces are formed in the flip for respectively contacting the conductor caps of the hinge shafts when mounting the flip on the main set, thereby establishing an electrical signal path between the microphone and audio circuit by means of mechanical contacts.

The present invention will now be described more specifically with reference to the drawings attached only by way of example. Throughout the drawings, same reference numerals are used to represent same functional elements

DETAILED DESCRIPTION OF THE PREFERRED EMBODIMENT

Figure 1:
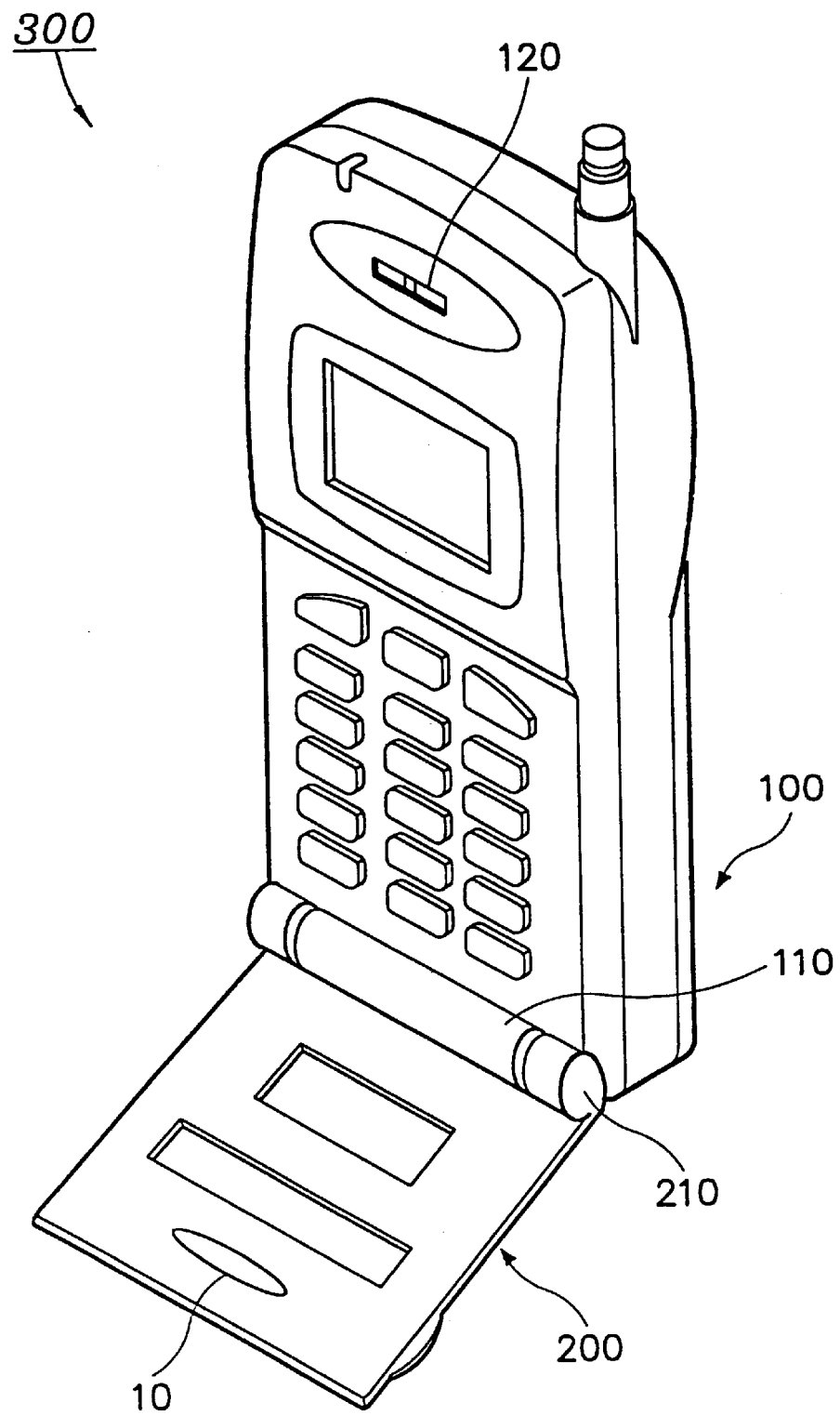
FIG. 1 is a perspective view for illustrating a flip-type radio phone with a microphone attachment for functionally connecting a microphone with an audio circuit according to the illustrative embodiment of the present invention.

Referring to FIG. 1, a flip 200 is connected with a main set 100 by means of a connecting device 110. A microphone 10 is mounted within the flip 200 to secure at least 14 cm for the distance between the microphone 10 and the speaker 120 when opening the flip.

Figure 2:
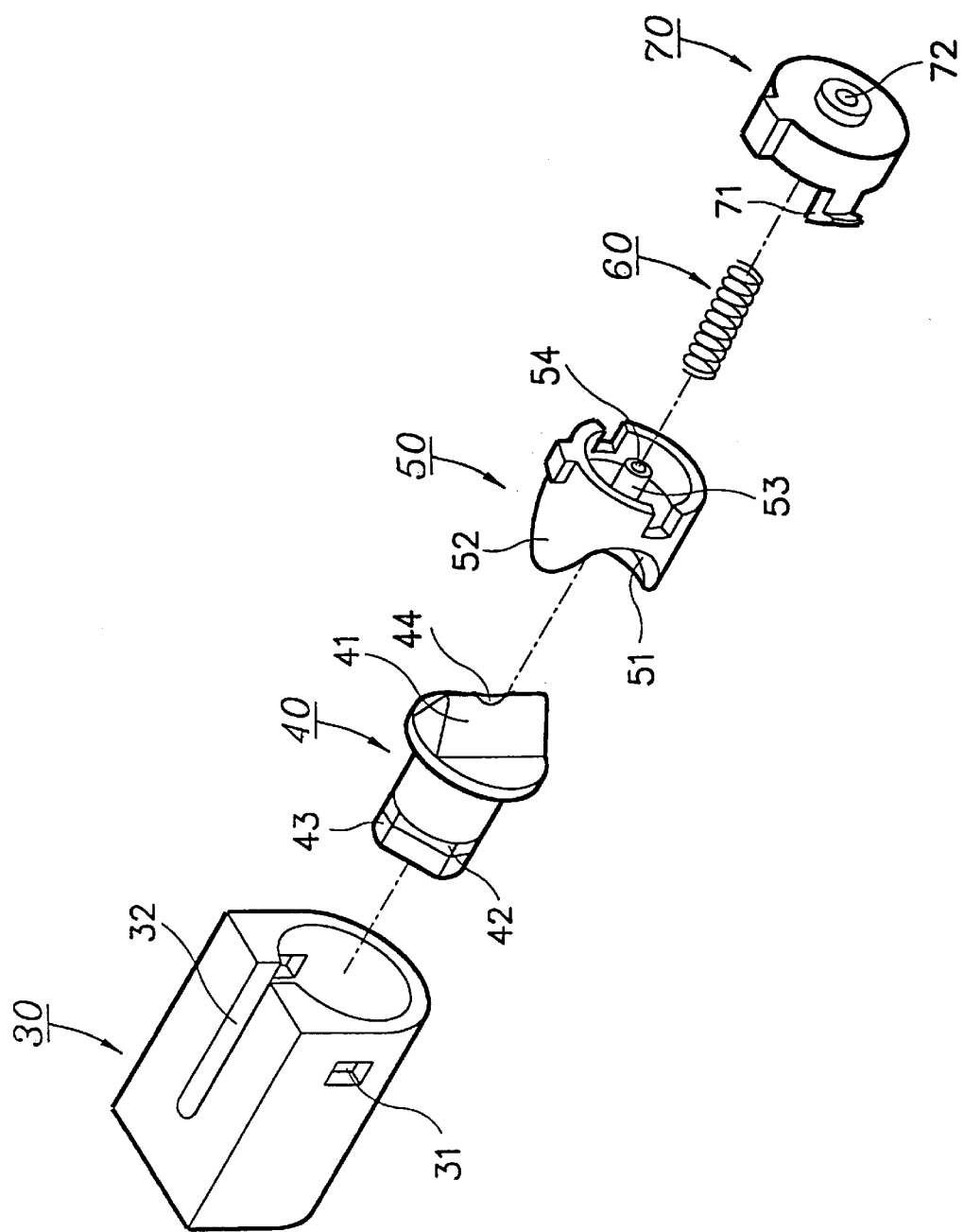
FIG. 2 is an exploded view for illustrating the inventive mechanical contact device or flip module arranged in the connecting device for connecting the flip and main set of a flip-type radio phone.
Figure 3:
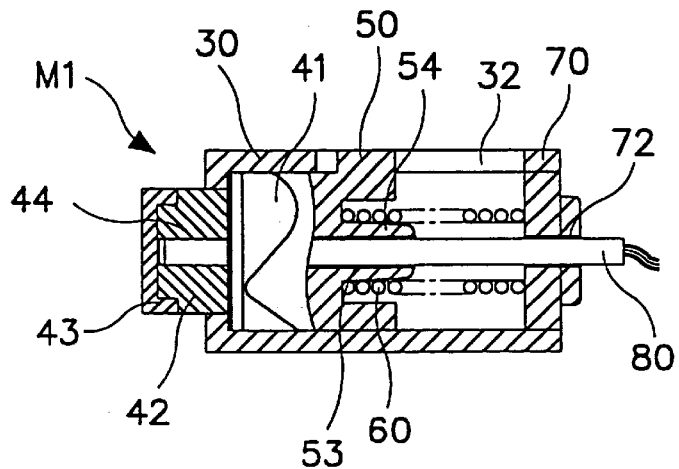
FIG. 3 is a cross sectional view for illustrating the inventive mechanical device assembled.
Figure 4:
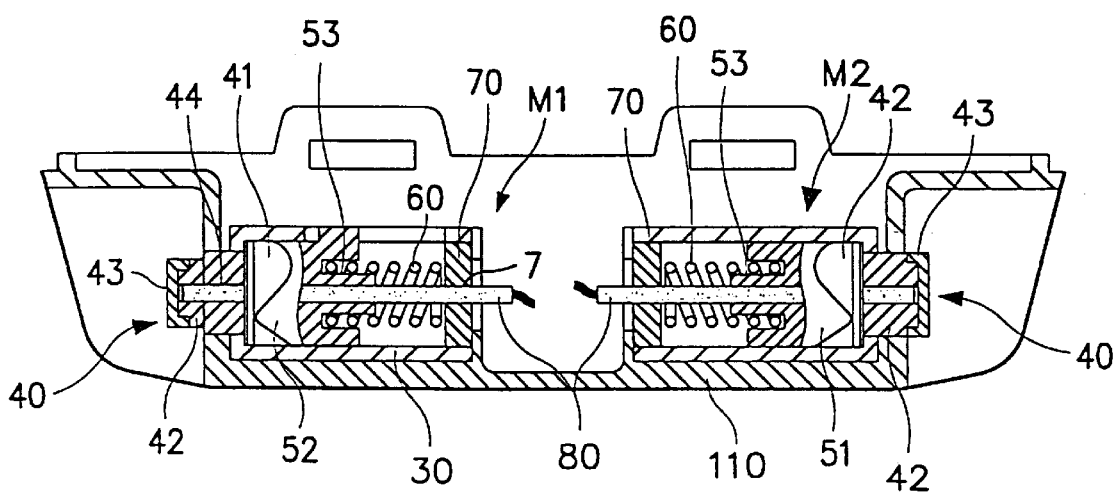
FIG. 4 is a cross sectional view for illustrating the inventive mechanical device mounted in the connecting device arranged between the flip and main set of a flip-type radio phone.

Describing the microphone attachment arranged in the connecting device with reference to FIGS. 2, 3, and 4 it includes a mechanical contact device having a pair of flip modules M1 and M2 attached symmetrically to both sides of the connecting device 110. Each of the flip module includes a hinge housing 30 having through hole and an elongated guide slot 32. One flip module M1 is arranged with the elongated guide slot 32 facing in the direction normal to the switch button surface of the main set while the other flip module M2 is arranged with the elongated guide slot 32 facing in the direction parallel to the switch button surface. It is readily apparent that this is to make the flip securely kept in the open communication position at an angle of about 135° or the close standby position at the angle of about zero.

The flip module also includes a hinge shaft 40 inserted into the through hole of the hinge housing 30, a cam hinge 50 engaging with the hinge shaft 40, a hinge cover 70 arranged towards the cam hinge to cover one end of the hinge housing, a coil spring 60 compressively disposed between the cam hinge 50 and the hinge cover 70, and a wire 80 arranged along the central axis of the hinge shaft.

The hinge housing 30 has a plane surface, the elongated slot 32 and a curved surface to facilitate connection to the flip module. Formed in both sides of the curved surface around the elongated slot 32 are a pair of fastening holes 31. The hinge shaft 40 has a projection having a triangular cross section at one end and a shank 42 at the other end. The end of the shank 42 is covered with a conductor cap 43.

The cam hinge has a depressed and a projected part 51 and 52, respectively at one end and a spring support part 53 at the other end. The depressed part 51 is engaged with the projection 41 of the hinge shaft 40.

A wire 80 is provided to serve as a signal path between the microphone and the audio circuit. To this end, a shaft hole 44 is formed along the central axis of the hinge shaft 40. A cam hole 54 is formed along the central axis of the cam hinge 50 concentrically with the shaft hole 44. A cover hole 72 is formed along the central axis of the hinge cover concentrically with the cam hole 54. The wire 80 is inserted into the shaft hole 44, cam hole 54 and cover hole 72 with one end firmly connected to the conductor cap 43 and the other end connected to the audio circuit. The diameters of the cam hole 54 and cover hole 72 are made greater than the diameter of the wire 80 to allow sliding motions of the cam hinge 50 and hinge cover 70 along the wire upon opening or closing of the flip from or to the main set.

Figure 5:
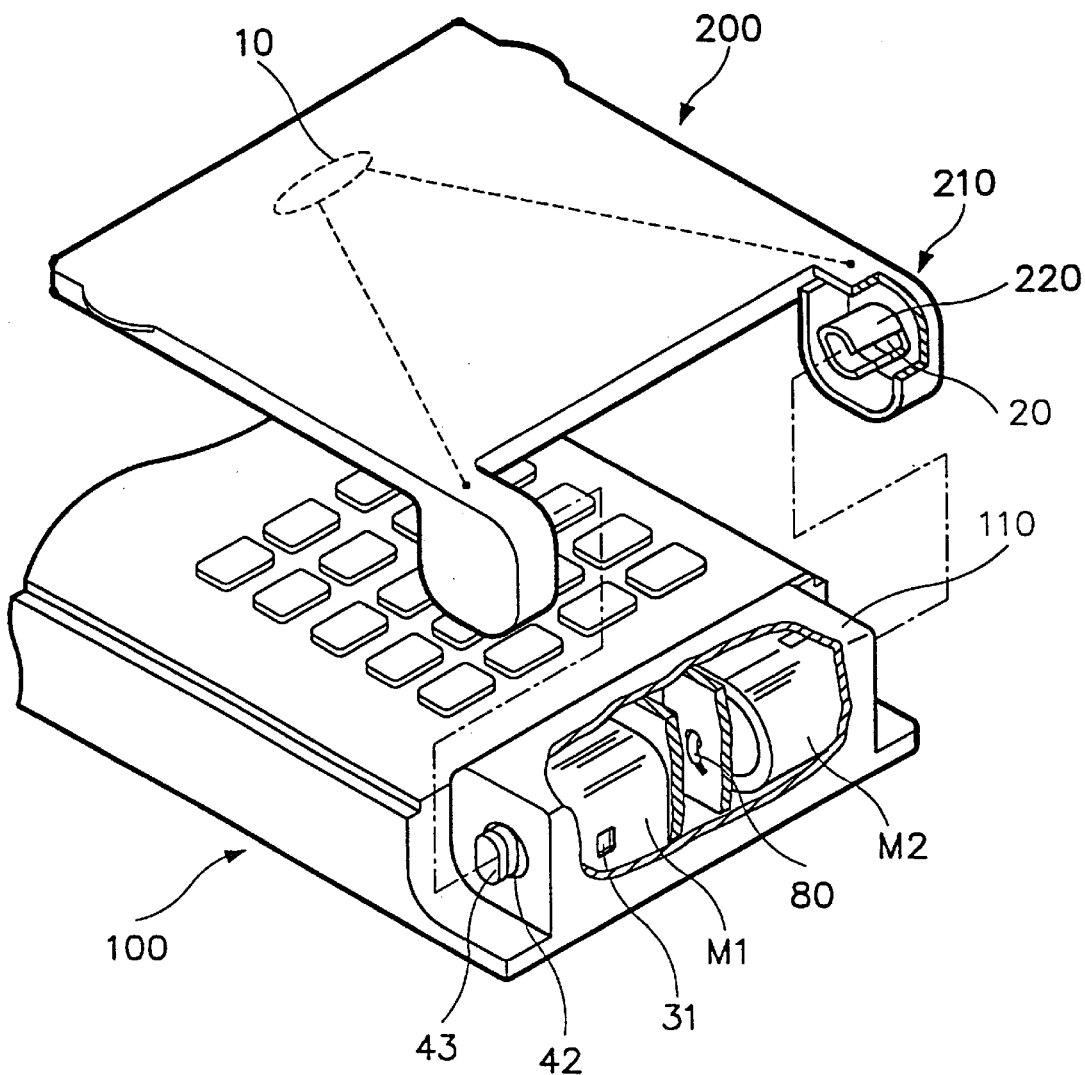
FIG. 5 is a partial perspective view for illustrating the flip being attached to the main set of the telephone according to the illustrative embodiment of the present invention.

Referring to FIG. 5, the flip 200 is provided with a pair of neck parts 210 respectively formed at both sides of an end for connecting to the main set. The neck part includes a hook 220 to hold the conductor cap 43. A pair of electrical contact surfaces 20 are respectively embedded in the hooks. Both poles of the microphone 10 are respectively connected with the pair of electrical contact surfaces 20 (shown by dotted lines), preferably by patterning or by embedded wiring within the flip.

Attaching symmetrically the flip modules M1 and M2 to both sides of the connecting device, as shown in FIG. 5, the conductor caps 43 mounted on the ends of the shanks 42 of the hinge shafts 40 are projected respectively out of both ends of the connecting device 110 under the biasing force of the compressed coil springs 60. Then, mounting the flip 200 on the main set 100 by connecting the hooks 220 with the ends of the shanks 42, the electrical contact surfaces 20 are respectively contacted with the conductor caps 43, which are connected to an audio circuit (not shown) through the wire 80.

When opening the flip cover 200 to make a call, the curved surface between the depressed part 51 and projected part 52 of the cam hinge 50 cooperates slidingly with the projection 41 of the hinge shaft 40, so that the cam hinge reciprocates along the core until reaching the open fixed position. In this position, the projection 41 engages with the depressed part 51 of the cam hinge 50 with the help of the resilient force of the coil spring 60. Similarly, the closing of the flip 200 is performed in the like manner. Thus, the audio signal generated by the microphone mounted in the flip 200 can be transferred to the audio circuit by means of the mechanical contact device including the conductor caps and electrical contact surfaces. Preferably, the radiophone includes circuitry or software for reducing or eliminating the noises caused by the opening and closing of the flip.

Advantageously, the device of the present invention establishes mechanical connection of the flip and an electrical connection of the microphone of the flip to the main set in a radio phone, facilitating ease of usage and repair of an impaired flip.

While the present invention has bee described by means of specific embodiments with accompanying drawings, it will be readily apparent to those skilled in the art that various modifications may be made without departing from the spirit of the invention.

What is claimed is:

1. A radio phone having a flip, a main set, a microphone within said flip, and an audio circuit within said main set, said radio phone comprising:

a connecting device for connecting said flip and said main set, and to provide a central axis of rotation for opening and closing said flip with respect to said main set, said connecting device including:

an electrical contact device including a pair of conductor caps positioned in alignment with said central axis of rotation, said contact device providing an electrical connection between said microphone in said flip and said audio circuit in said main set;

a pair of hinge housings each having through holes attached to both sides of said connecting device;

a pair of hinge shafts insertable into each of said hinge housings through the through holes, the conductor caps attached to both ends of said hinge shafts;

a pair of shaft holes each formed along a central axis of a corresponding hinge shaft;

a first wire and a second wire connected to said audio circuit, said first and second wires each being inserted into a corresponding shaft hole for connecting to a corresponding conductor cap; and a pair of electrical contact surfaces formed in said flip for contacting the conductor caps of said hinge shafts for establishing an electrical signal path between said microphone and said audio circuit.

2. The radio phone of claim 1, further having:

a projection formed at an end of each of said hinge shafts;

a shaft hole formed along a central axis of each of said hinge shafts;

said conductor caps attached to the other ends of said hinge shafts;

a cam hinge having a depressed and a projected part at one end and a spring support part at the other end, said depressed part being engaged with the projection of each of said hinge shafts;

a cam hole formed along the central axis of said cam hinge concentrically with said shaft hole;

a hinge cover arranged to face the spring support part of said cam hinge for covering each of said hinge housings;

a cover hole formed along the central axis of said hinge cover concentrically with said cam hole;

a coil spring compressively disposed between said cam hinge and hinge cover; and said first wire and second wire inserted into said shaft hole, cam hole and cover hole to connect said conductor caps to said audio circuit, the diameters of said cam hole and cover hole being made greater than the diameter of said first wire or said second wire to allow sliding motions of said cam hinge and hinge cover along said corresponding wire upon opening or closing the flip from or to said main set.

3. The radio phone as defined in claim 1, wherein said flip includes a pair of neck parts respectively formed at both sides of the end part connected to said main set, said pair of electrical contact surfaces being respectively embedded in said pair of neck parts.

* * * * *